United States Patent [19]

Barclay

[11] Patent Number: 4,802,635
[45] Date of Patent: Feb. 7, 1989

[54] APPARATUS AND METHOD FOR COMPACTING A SCRAP TIRE

[76] Inventor: Randel L. Barclay, 5616 Carpenter Rd., Stockton, Calif. 95205

[21] Appl. No.: 94,714

[22] Filed: Sep. 9, 1987

Related U.S. Application Data

[63] Continuation-in-part of Ser. No. 001,686, Jan. 9, 1987, Pat. No. 4,738,172.

[51] Int. Cl.$^4$ .................. B02C 18/06; B02C 23/02; B26D 7/14
[52] U.S. Cl. ..................................... 241/30; 83/923; 83/925 R; 241/236; 241/DIG. 31; 242/67.1 R; 242/76
[58] Field of Search .............. 83/54, 13, 23, 923, 83/925 R, 926 R; 241/30, 236, DIG. 31; 242/67.1 R, 76

[56] References Cited

U.S. PATENT DOCUMENTS

| | | | |
|---|---|---|---|
| 3,843,074 | 10/1974 | Tupper | 241/222 |
| 3,911,772 | 10/1975 | Kisielewski | 83/278 |
| 4,216,916 | 8/1980 | Tupper | 241/36 |
| 4,278,413 | 7/1981 | Hilt | 83/54 X |
| 4,338,839 | 7/1982 | Farrell, Sr. et al. | 83/620 |
| 4,338,840 | 7/1982 | Farrell, Sr. et al. | 83/622 |
| 4,422,581 | 12/1983 | Chryst | 241/66 |

FOREIGN PATENT DOCUMENTS

| | | | |
|---|---|---|---|
| 3413614 | 11/1984 | Fed. Rep. of Germany | 241/DIG. 31 |
| 937226 | 6/1982 | U.S.S.R. | 241/DIG. 31 |
| 2045108 | 10/1980 | United Kingdom | 241/DIG. 31 |

Primary Examiner—Frank T. Yost
Assistant Examiner—Hien H. Phan
Attorney, Agent, or Firm—Thomas Schneck

[57] ABSTRACT

A method and apparatus for compacting a scrap tire by removing the bead wires from the tire and coiling the debeaded tire casing. The debeading assembly includes a movable carriage in a plurality of rolls positioned to fit within the inside diameter of a tire. One of these rolls is a tensioning roll that is movable so as to stretch the tire and elongate the bead wires. Bead wire elongation permits accommodation of various sized tires, as elongation standardizes the arc against a bead guide roll. Compression forces provided to align the bead wires in a mutually proximate position against the bead guide roll. The carriage is advance until a pair of overlapping and counterrotating shearing members have made a first tire shear that is at least closely tangential to the bead wires, but which does not extend beyond the radius of the bead guide roll which is perpendicular to the direction of carriage movement. After carriage movement has ceased, the pull provided by the shearing members causes the tire to rotate, thereby producing a second shear which disembodies the tire casing from the bead wires. The debeaded elongation of tire is then compressed between a mandrel and a bend assembly. The bend assembly includes a plurality of rollers, at least some of which are concave relative to said mandrel. The mandrel is spring biased in the direction of the bend assembly. The bend assembly will wrap the debeaded elongation of tire about the mandrel and the mandrel will recede from the bend assembly as each layer of tire is provided.

16 Claims, 7 Drawing Sheets

APPARATUS AND METHOD FOR COMPACTING A SCRAP TIRE

CROSS-REFERENCE TO RELATED APPLICATION

This is a continuation-in-part of Application Ser. No. 001,686, filed Jan. 9, 1987 now U.S. Pat. No. 4,738,172.

TECHNICAL FIELD

The present invention relates to apparatus for reducing the volume of a scrap tire for transportation, disposal, further processing in other equipment, or further use as another article.

BACKGROUND ART

The problems of storing, transporting and disposing discarded tires are many and varied. Discarded tires provide a breeding ground for bacteria and for insects, as water collects within the interior of the tires and is slow to evaporate.

The dimensions of a tire make it difficult to stack tires in a low volume-consuming manner. In transporting tires to a burial site or to a recycling plant, motor trucks at times carry only about one-half a full load by weight. Since a motor truck operated at less than a full weight potential costs very nearly as much as a truck which is at its capacity, the cost effectiveness of transporting tires may be increased by volume densification prior to shipment.

In tire disposal by burial, government regulations have been enacted to prevent burial of intact tires, since such tires have a tendency to resurface. Thus, some cutting of the tire is required.

In tire disposal by incineration, the most common methods include reducing scrap tires into small chips. The chips are more easily handled than a bulky tire and are more cost effective to burn. Apparatus for shredding rubber tires are known. U.K. Patent No. 2,045,108 to Schmidt teaches an apparatus which granulates old tires. A tire is first cut into circumferentially extending strips by a longitudinally cutting device, whereafter the tire bead wires are rejected and the strips of tire are cut transversely in a second cutting operation. The rubber portion of each tire piece is then separated from the fabric in a crushing mill.

The purpose of the Schmidt apparatus is to granulate discarded tires for retrieval of materials. However, material retrieval is an expensive process and is often cost prohibitive. Granulation is not desirable if tire segmentation is sought for purposes of burning, burial, or ease of handling and transporting. U.S. Pat. No. 3,911,772 to Kisielewski discloses a mobile material cutter that makes a diametrical cut across a tire to halve the tire. While this halving of a tire permits an increased weight load for motor trucks, a full load is still not possible. U.S. Pat. Nos. 4,338,839 and 4,338,840 to Farrell, Sr. et al. disclose portable cutting machines which quarter a tire by means of a hydraulic cylinder ram which drives blades into the tire. It has been shown, however, that quartering a tire will still not permit full load transportation. Aditionally, halving and quartering of a tire will not eliminate collection of water within pockets in the interior of the tire.

It is an object of the present invention to provide an apparatus and method which will densify a scrap tire for purposes such as transportation, burial and ease of handling. A further object is to provide such an apparatus and method which is both time and cost efficient.

DISCLOSURE OF THE INVENTION

The above objects have been met by a tire compacting method and apparatus which continuously circumferentially shears tire bead wires from the side walls of a tire and then coils the tire into overlapping layers of rubber, forming a roll or coil. A first shear results from linear tire movement toward counterrotating circular shearing members in a direction that is at least closely tangential to the bead wires. When the first shear reaches a point at or near the bead wires, the linear tire movement is ceased. The shearing force of the shearing members, however, continues to draw the tire and causes rotational tire movement, thereby making a second cut which is substantially concentric with the inside circumference of the tire. As a result of the sequential cuts the bead wires are completely disembodied from the tire outer casing, which is in the form of an elongation having a length at least as great as the original circumference of the tire. The debeaded elongation is then compressed to bring each tire side wall to a plane common with the tire crown portion, whereafter the elongation is turned back upon itself to coil the debeaded elongation about a coil axis which transposes the exterior and interior surfaces of the tire.

The tire debeading and coiling apparatus includes a movable carriage having a number of tire positioning rolls spaced apart to contact various areas within the inside diameter of the tire. The positioning rolls include a tensioning roll linked to an air cylinder so that activation of the cylinder causes the tensioning roll to elongate the tire. This ability to elongate the tire permits the machine to debead tires of various sizes since bead wires are bent to an arc of known dimensions at the shearing point of the shearing members.

Compression rollers are arranged to exert a compression force on at least one side of the tire, bringing the opposed bead wires into mutual proximity. The carriage is then moved linearly toward a pair of counterrotating shearing members to effect a first shear that extends from the outer diameter of the tire to a location closely adjacent to the bead wires. During the first shear, the tensioning roll exerts a force upon the inside diameter to elongate the tire and to properly position the bead wires.

When the pinch point created by the shearing members is proximate the bead wires, a stop prevents the carriage from further movement. However, the circumference of each shearing member is saw-toothed, and the teeth create a pull which causes the tire to begin to rotate. As the tire rotates the outer casing of the tire is disembodied from the bead wires. An idler disc positioned near the shearing facilitates tire rotation.

The first, linear shear of the tire provides a tire casing tongue which moves beyond the shearing members as further shearing is performed. The tire casing tongue is captured between a bend assembly and a rotating mandrel. The mandrel is spring biased in the direction of the bend assembly to exert a leveling force onto the exterior surface of the tire casing.

The second, circular shear of the tire provides a debeaded elongation of tire casing. As the length of the tire casing is sequentially brought between the bend assembly and the mandrel, the leveling force will cause the tire side walls to infold to a plane common with the crown portion of the tire casing. Preferably, the bend assembly is a plurality of guide rolls which are concave relative to the mandrel, thereby turning the tire casing back onto itself and in contact with the mandrel. The natural resiliency of the tire causes the tire to follow the rotation of the mandrel so as to wrap around the mandrel. The spring biasing permits the mandrel to recede from the bend assembly as the layers of tire casing wrap about the mandrel. The coil of tire casing may then be stapled or otherwise secured to ensure tightness of the winding, but this is not critical since the coil is self-securing in a less tightly wound roll. Outer edges of the casing coil further radially inwardly than the center portion, holding each layer in place in combination with friction between contacting layers.

An advantage of the present invention is that the resulting coil of tire casing can be easily handled. Other advantages result from the fact that the coil may be transported in a low volume consuming manner and may be stored without the risk of pockets of water forming within the interior to provide breeding grounds for bacteria and insects. Still another advantage is that the coil of tire casing is more dense than an annular tire and will therefore burn hotter and longer when incinerated. Yet another advantage is that the tire coil has utility by itself, as a boat bumper or the like.

BEST MODE FOR CARRYING OUT THE INVENTION

Figure 1:
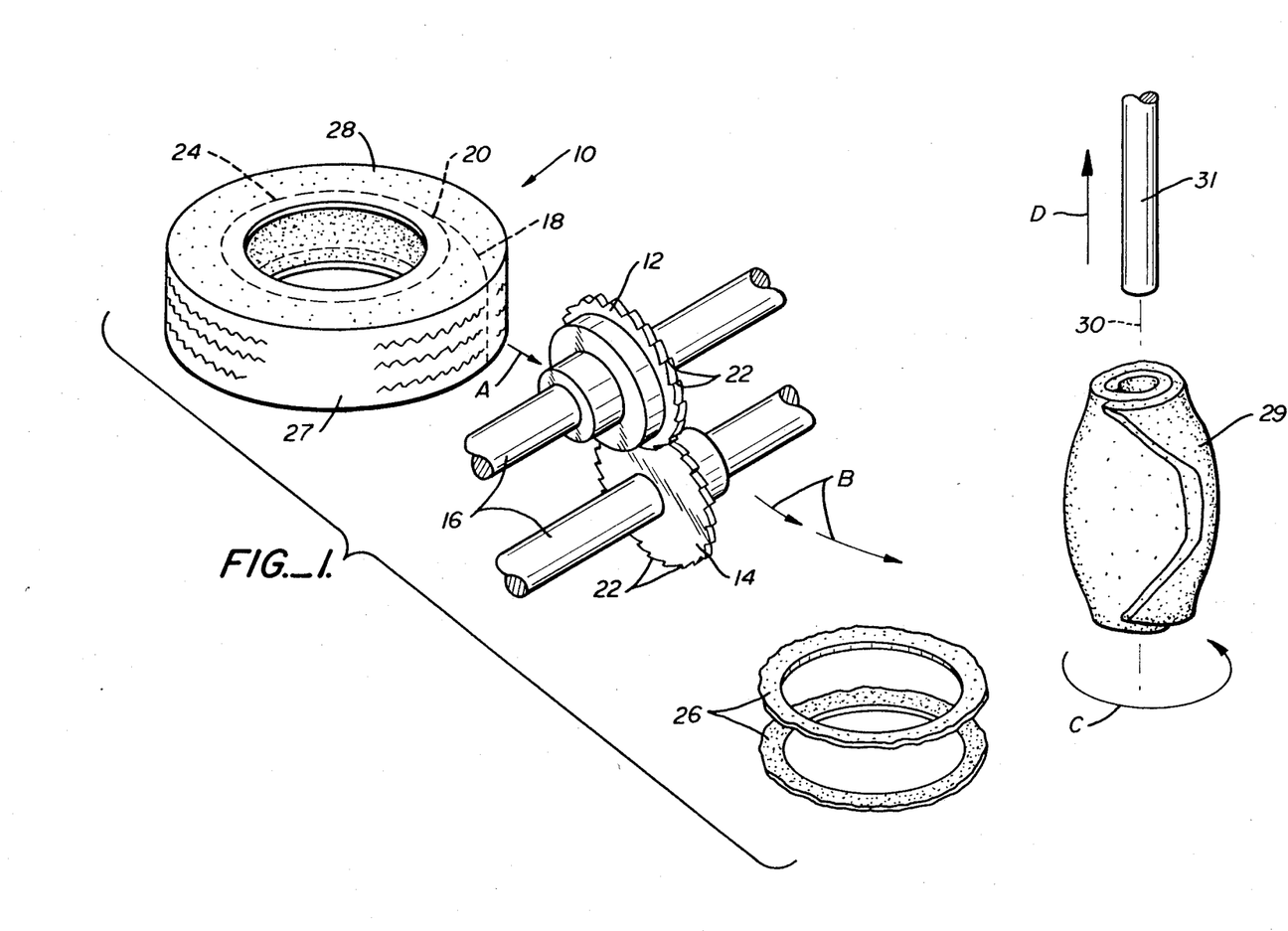
FIG. 1 is a plan view of the tire debeading and coiling operation carried out by utilization of the present invention.

With reference to FIG. 1, a tire 10 is fed into a pair of counterrotating shears 12 and 14 that are mounted on parallel shafts 16. Linear movement of the tire 10 in the direction of Arrow A produces a first cut 18. When the tire reaches a point 20 at which the shears 12 and 14 are near the bead wires of the tire, linear movement ceases. However, saw-teeth 22 on the circumference of the shears 12 and 14 continue to draw the tire toward the shears, producing a second cut 24 that is concentric with the inner circumference of the tire 10. As a result of the first and second cuts 18 and 24, the bead wires 26 are disembodied from the inner circumference of the tire 10. The tire casing, which comprises a crown portion 27 and opposed side walls 28 of the tire 10, travels past the shears, as indicated by Arrows B, and is caused to be turned back upon itself to form a coil 29. That is, the tire casing is wrapped, as shown by Arrow C, about a coil axis 30 such that the interior and exterior surfaces of the crown portion 27 are transposed relative to the original form the of tire 10. The coil axis 30 is defined by a mandrel 31. As shown by Arrow D, the coil 29 of tire is then removed from mandrel 31 so that the mandrel may be used in coiling other tire casings.

The coil 29 of tire is a plurality of overlapping layers of tire casing which are held in position relative to other layers by the contact friction between adjacent layers and, ironically, by the natural resiliency of the tire casing. Preferably, the diameter of the coil 29 approximates the inside diameter of the tire 10 as originally formed. The coil 29 is more easily stored, transported, buried or recycled.

A. The Debeading Process

Figure 2:
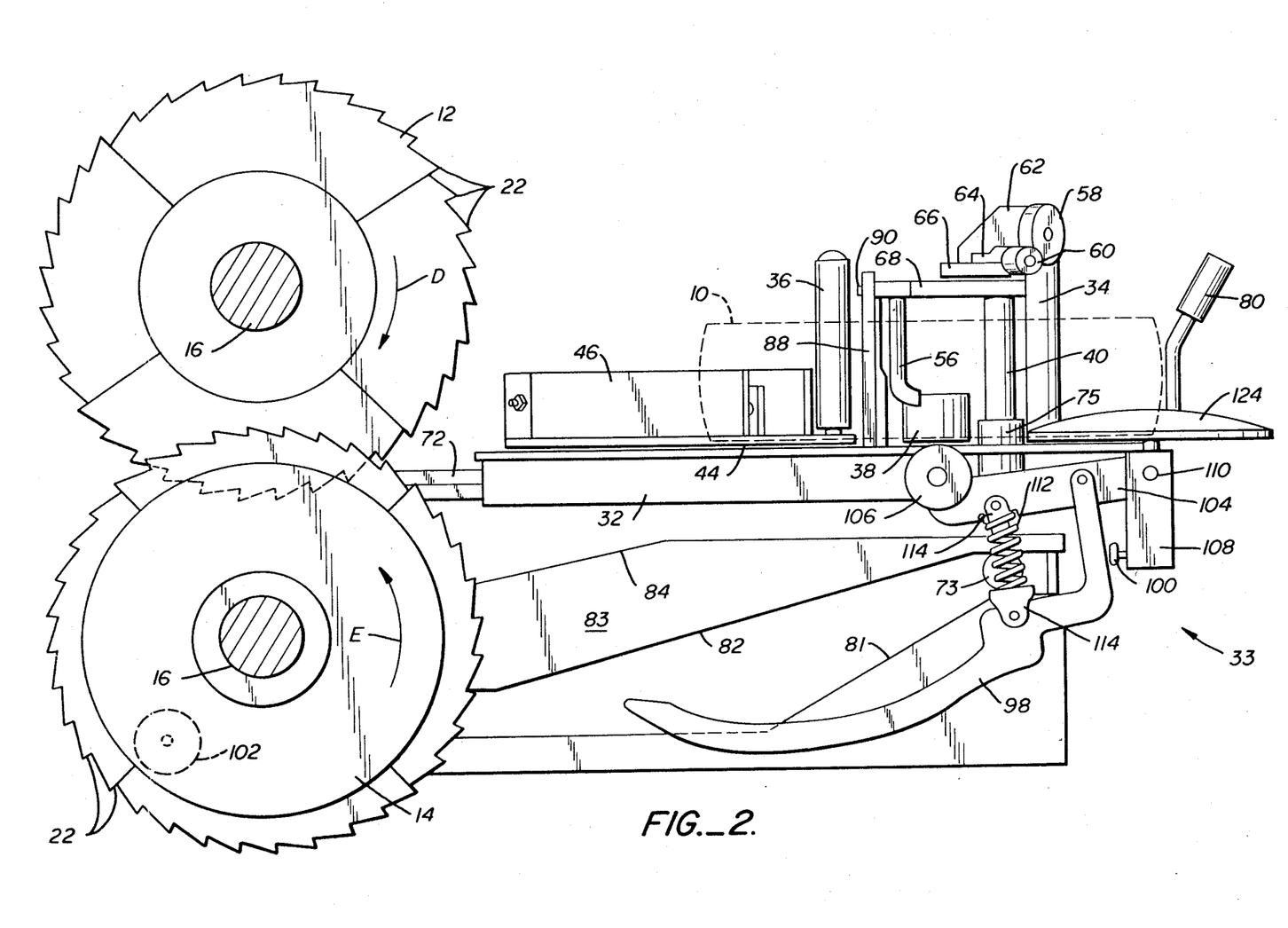
FIG. 2 is a side view of the tire debeading apparatus of the present invention.
Figure 3:
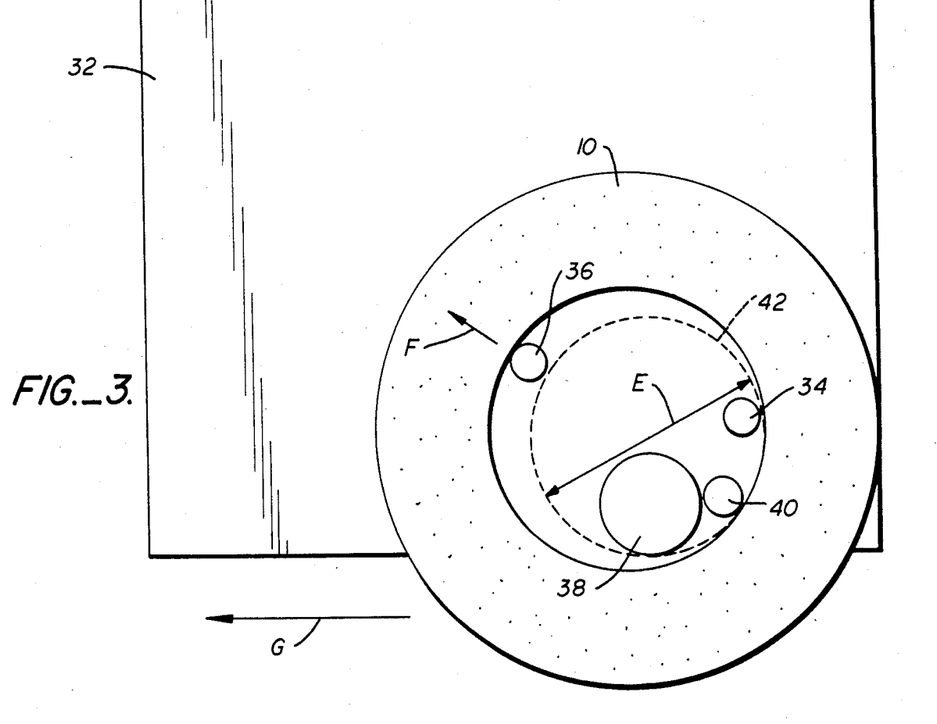
FIGS. 3 and 3A are top diagrammatic views of the debeading apparatus of FIG. 2.

Referring now to FIGS. 2 and 3, the tire 10 is supported atop a carriage 32 of a debeading machine 33. An upright stationary roll 34 contacts the tire along a first area of the inner circumference of the tire. A movable tensioning roll 36 and a bead guide roll 38 also contact the inner circumference so that the tire is fixed in position atop the carriage. It is understood that rolls 34, 36 and 38 are not limited to the cylindrical configuration illustrated in the drawings. The rolls may be semicircular posts or may have any other configuration which does not restrict rotation of the tire about its axis. Likewise, the rolls may be fixed or may be rotatable. For example, the bead guide roll 38 may be driven at a speed calculated from the pitch line speed of the shears 12 and 14.

In addition to the rolls 34, 36 and 38, the inner circumference of the tire 10 is in frictional contact with an extensible rod 40. The positioning of the rolls 34 and 38, along with the extensible rod 40, accommodate the arc 42 at the inner circumference of a thirteen inch tire, shown in phantom in FIG. 3. The stationary roll 34 is spaced apart from the bead guide roll 38 by 100°, as measured by radii projecting from the axis of arc 42 and through the rolls 34 and 38. The stationary roll is spaced apart from the extensible rod 40 by 45°. Thus, the stationary rolls 34 and 38 and rod 40 which combine to define the thirteen inch arc 42 are contained within a single semicircular region, as defined by line E.

The centers of the extensible rod 40 and the tensioning roll 36 are spaced apart by 180°. The tensioning roll 36 is mounted on a slide 44 which is controlled by a pneumatic cylinder 46. Preferably, the slide 44 is positioned below the carriage 32 and the tensioning roll projects up through an elongated slot, not shown, in the carriage. The pneumatic cylinder 46 provides a radially outward motion, shown by Arrow F in FIG. 3.

Figure 3A:
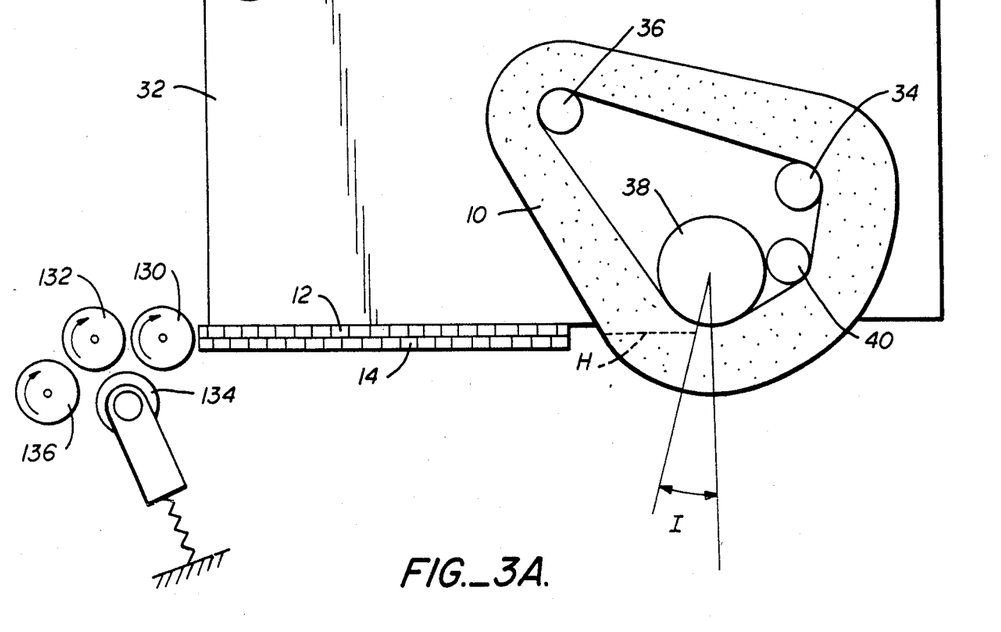

A comparison of FIGS. 3 and 3A illustrates the stretching of a tire 10 properly tensioned by tensioning roll 36. Critical to the proper operation of the debeading machine is that the bead wires of the tire be crowded against the bead guide roll 38 during shearing. The tensioning roll 36 insures that the tire bead wires are elongated and do, in fact, crowd the bead guide roll 38. The carriage 32 moves in the direction of Arrow G toward the counterrotating shears 12 and 14. Normally a tire contacting a cutting mechanism is deformed by the shearing force. The elongation of the tire 10 by the tensioning roller 36, however, will minimize deformation. The tire elongation results in a linear shear along line H that is shorter and is closer to a radial shear than the shear that would occur if the tire were not tensioned. A radial shear is less likely to deform the tire because the shears approach the tire at a right angle to the tire crown portion.

At the completion of the linear shear along line H, the carriage 32 is prevented from further travel by a carriage stop, not shown. The saw-teeth of the shears 12 and 14 will continue to pull the tire casing into the shear point after carriage travel has ceased. Consequently, the elongated tire 10 will rotate. The rotation begins the debeading process which separates the tire casing from the tire bead wires.

The shearing point defined by the rotary shears 12 and 14 must not extend beyond the radius of the bead guide roll which is perpendicular to carriage travel. Preferably, the angle, shown as Angle I in FIG. 3A, is between 10° and 15°. If the carriage 32 were to travel too far, the pull of the shears would be reversed and the tire casing would increasingly accumulate in the area designated to accommodate the two bead wires only. Failure of the debeading process would result.

The debeading machine is designed to accommodate tires as small as thirteen inches. The rolls 34 and 38 and the extensible rod 40 form the arc of a thirteen inch tire, and tensioning roll 36 may be extended to contact the inside diameter of the tire. But elongation of the tire bead wires permits larger tires to be debeaded. The elongation standardizes the arc of the bead wires in the critical region of bead wire retention. The elongated configuration ensures that the bead wires are stretched tightly across the bead guide support 38 so that the bead wires are not pulled into the shear point defined by the shears 12 and 14. The arc of a thirteen inch tire was chosen because smaller tires are typically not debeaded. The debeading machine may, however, be modified to accommodate tires having an inside diameter less than thirteen inches.

Referring again to FIG. 2, at least initially the height of the tire 10 will prevent an upper bead wire from contacting the bead guide roll 38. For this reason, a hooked crowding bar 56 is positioned so that the upper bead wire will be pressed against the crowding bar 56. Preferably, the crowding bar has a length that causes both the upper and the lower bead wires to be crowded against the bar when the bead wires are elongated. Alternatively, the bead guide roll 38 may have sufficient height to contact both the upper and lower bead wires. Such a bead guide roll would eliminate the need of a crowding bar, but would require that the upper shaft 16 be kept short to prevent contact with the bead guide roll.

Even after elongation of the bead wires, a tire is not aligned properly for the shears 12 and 14 to make the desired cuts. The bead wires must be drawn together against the bead guide roll 38, in alignment with the pinch point of the shears. A precompression roller 58 and a compression roller 60 provide compression force to the inside diameter of the tire. The precompression roller and compression roller are rotatably mounted to upright plates 62 and 64 which are each attached to a fixed plate 66. Below the fixed plate 66 is a pivoting plate 68, both plates 66 and 68 being mounted to the extensible rod 40.

Figure 4:
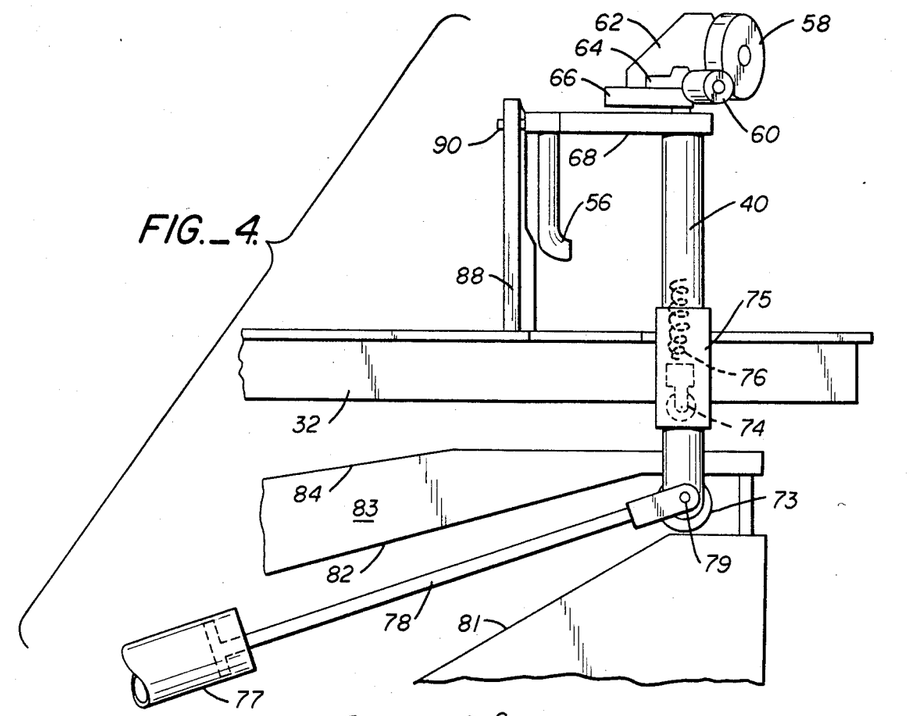
FIG. 4 is a side view of the upper compression assembly of the of FIG. 2.

The carriage 32 is supported on rails 72 by a set of six ball bearings, not shown. FIGS. 2 and 4 show the carriage 32 in a rearward loading position. In this loading position the precompression roller 58 and the compression roller 60 are held upward by a lower wheel 73 at the end of the extensible rod 40 and by an upper wheel 74. The upper wheel is attached to the portion of the extensible rod 40 that is slidably fit into a sleeve 75 fixed to the carriage 32. A spring 76 biases the extensible rod 40 upwardly when weight from the rod is transferred to the upper wheel 74. FIG. 4 shows the upper wheel 74 as being spaced apart from any supporting surface, but the position of this wheel when the carriage is in a rearward position is dependent on the elasticity of the spring 76.

Movement to the carriage 32 is provided by a second air cylinder 77. A cylinder rod 78 is fixed to the lower wheel 73 and the extensible rod 40 by a pin- and-nut arrangement 79. The tensioning air cylinder 46 and the advancement air cylinder 77 are operationally interconnected to ensure the proper sequence of steps in debeading a tire. Both air cylinders 46 and 77 work off a common hand actuated air valve, not shown. The tensioning air cylinder charges immediately. After an internal pressure of 100 psi is reached, a dump valve allows air pressure to continue to the advancement air cylinder. Thus, the carriage is not set in motion until the bead wires have been elongated. A carriage lock 80 may be used to lock the carriage in position for safety.

Forward movement of the carriage 32 causes the extensible rod 40 to descend as the lower wheel 73 follows a lower cam surface 81. However, the wheel 73 will gravity fall only until the compression roller 60 contacts the side wall of the tire. Any forward movement beyond this point lifts the lower wheel 73 from the lower cam surface 81. The lower wheel 73 will provide compression force to the side wall of the tire only when the wheel is forced downwardly by an upper cam surface 82 that is part of a cam plate 83.

During rearward motion of the carriage 32, on the other hand, the upper wheel 74 follows a return cam surface 84 that is part of the cam plate 83. As the upper wheel ramps up the cam surface 84 the extensible rod 40 rises to return the compression rollers 58 and 60 toward a tire loading position. When the carriage nears its rearward position, the lower wheel 73 engages the lower cam surface 81 to provide a fast rise for the extensible rod 40.

Figures 5, 7:
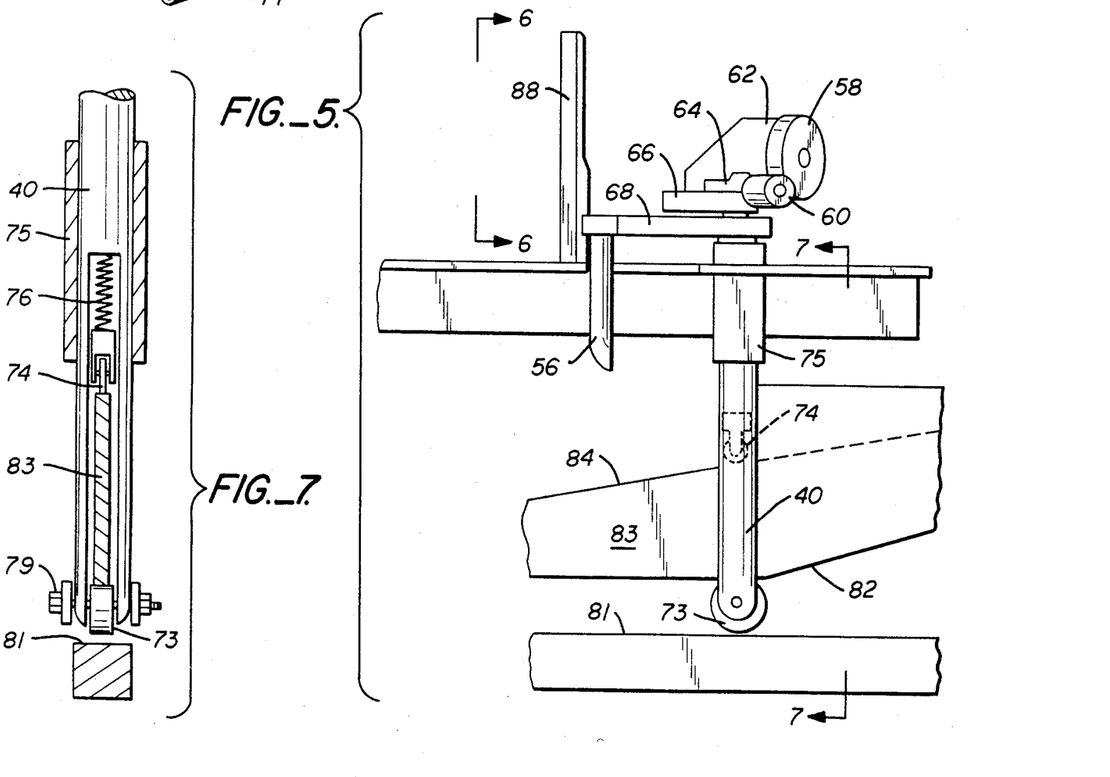
FIG. 5 is a side view of the assembly of FIG. 4 in a shearing position.
FIG. 7 is a front view of a cam rod taken along lines 7—7 of FIG. 5.

FIGS. 5 and 7 illustrate the positioning of the above-described compression assembly when the carriage 32 is in a forward position. For purposes of clarity, the tire and the bead guide roll are omitted. The interaction of the upper cam surface 82, the lower wheel 73 and the extensible rod 40 applies compression force to the bead wires of the tire. Wheel 73 is rotatably mounted to the extensible rod by the pin-and-nut arrangement 79. The working surface of the precompression roller 58 is slightly higher than the working surface of the compression roller 60. The precompression roller provides the initial force so that the compression roller may bring the bead wires to a gauged height without regard to the original size of the tire.

As noted above, elongation of the tire crowds the bead wires against the crowding bar 56. When the side wall of the tire has been compressed, the bead wires are aligned with the bead guide roll 38. At that point the crowding bar has served its purpose. Thus, a slotted plate 88 pivots the pivoting plate 68 so that the crowding bar is moved out of the way of the shears and the bead wires are crowded against the bead guide roll 38.

Figures 6, 9:
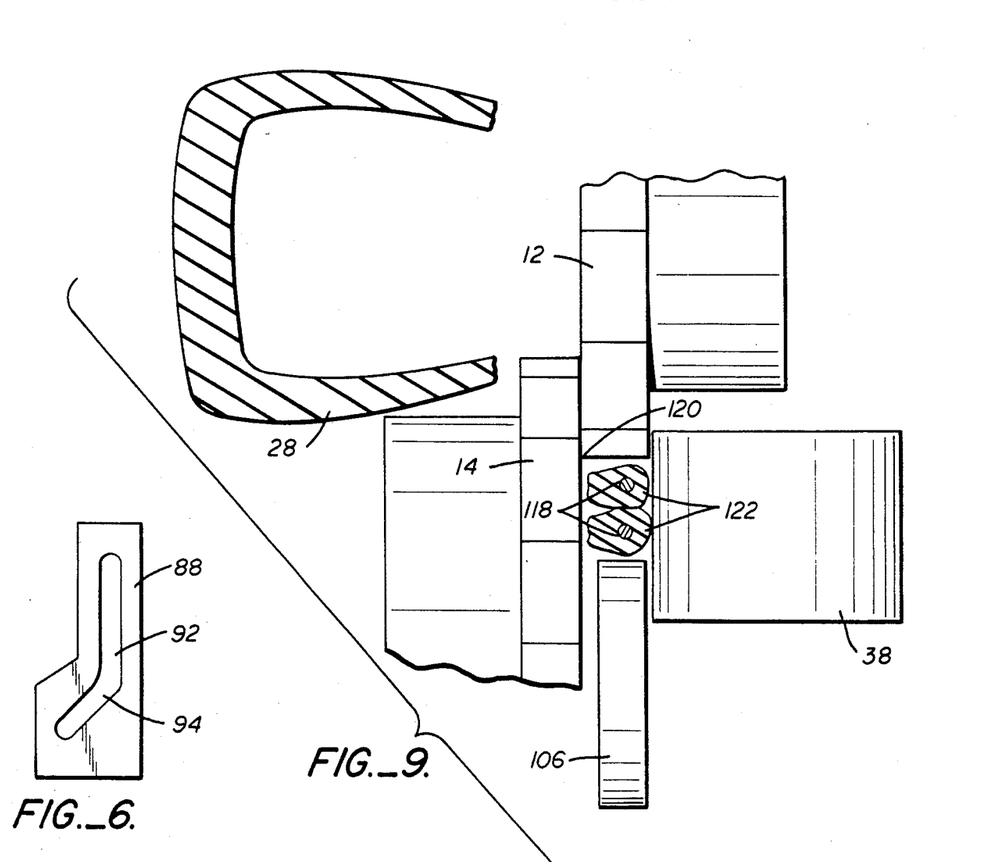
FIG. 6 is a rear view of a plate taken along lines 6—6 of FIG. 5.
FIG. 9 is a front view of the apparatus of FIG. 2 in a shearing operation.

FIGS. 4 and 6 illustrate the method of turning the pivoting plate 68. The pivoting plate 68 has a projection 90 which is slidably connected to the slotted plate 88. A slot in the slotted plate 88 has a vertical portion 92 which, by means of guiding the projection 90, guides the crowding bar 56 so as to descend for alignment of the bead wires with the bead guide roll 38. Then, when the bead wires are properly aligned, the slanted portion 94 of the slot pivots the pivoting plate 68 so that the crowding bar and pivoting plate will not contact the shaft which supports the upper shear.

Figure 8:
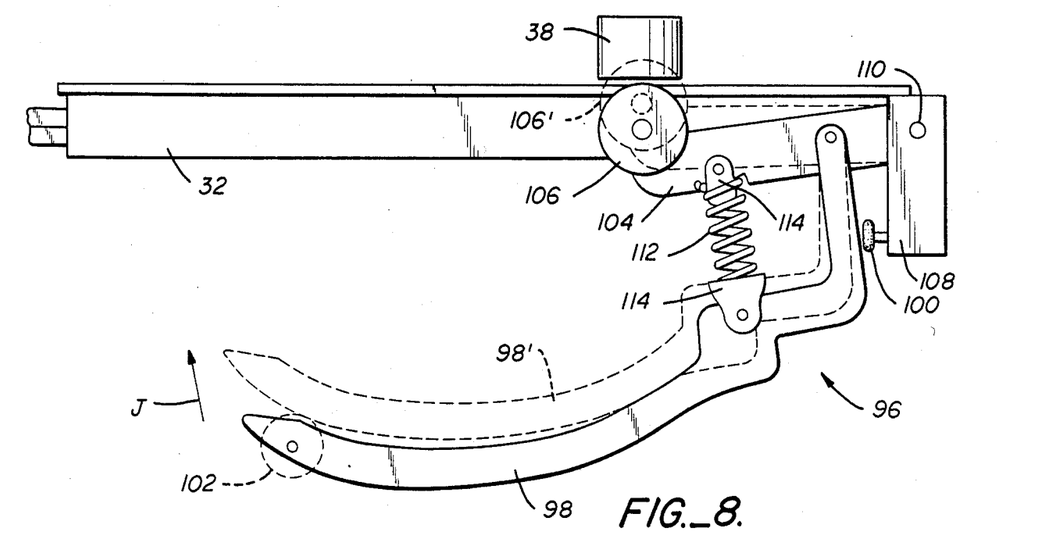
FIG. 8 is a side view of the lower compression assembly of the apparatus of FIG. 2.

Referring now to FIGS. 2 and 8, a lower compression assembly 96 ensures proper alignment of the lower bead wire with the bead guide roll 38. The lower compression assembly includes a cam ramp 98 which is normally held in a lowered rest position and against a nut or bumper 100. However, when the carriage 32 is brought forward the cam ramp is ramped upward on a wheel 102 to a compression position indicated by Arrow J and cam ramp 98'.

The wheel 102 causes the cam ramp 98 to pivot a compression arm 104, thereby bringing a lower compression roller 106 approximately midway up the carriage 32 to a position indicated by the roller 106'. The compression arm 104 is pivotably attached to a plate 108 at a pivot point 110. The lower compression roller 106 applies compression force to the lower bead wire. The compression arm 104 is biased upwardly by a spring 112 which is fixed to brackets 114. Preferably, the lower compression roller is pivoted into engagement with the tire within the last four to six inches of the carriage movement. If the roller 106 were pivoted too soon it is possible that the tire could be lifted away from the carriage, thereby causing positioning problems. Because the compression arm 104 is spring loaded, the lower compression roller 106 may be forced downwardly by a greater volume of rubber. Thus, the bead Wires of a variety of different sized tires may be removed by the debeading machine 33.

While the debeading machine has been illustrated as including a camming action to provide compression to the inner circumference of the tire, it is to be understood that this is not critical. Alternatively, the compression rollers 58, 60 and 106 may be actuated by hydraulic cylinders.

Referring now to FIGS. 1-8 generally, in operation a tire 10 is placed about the rolls 34, 36 and 38 when the carriage 32 is in a rearward position. In this tire loading position the precompression roller 58 and the compression roller 60 are held high by extensible rod 40, and the lower compression roller 106 is held low by the force of gravity. To compensate for the varying diameters of tires, the tensioning roll 36 is utilized to stretch the tire. The stretching elongates the bead wires of the tire, thereby ensuring that the bead wires are crowded against the crowding bar 56.

When the carriage is advanced forwardly, the precompression roller 58 and compression roller 60 provide a force to the upper bead wire of the tire 10. Simultaneously, the crowding bar 56 is lowered to bring the upper bead wire to a height at which the bead wire may be crowded against the bead guide roll 38. Just prior to shearing of the tire proximate the bead wire, the crowding bar 56 is pivoted out of position by the slotted plate 88 and the lower compression roller 106 exerts an upward force to the lower bead wire. The rollers 58, 60 and 106 position the bead wires in mutual proximity at a gauged height against the bead guide roll 38. Referring to FIGS. 2, 3 and 9, the upper shear 12 aids in the compression process by bringing the forward side of the tire to the pinch point of the shears 12 and 14. The shears each have a saw-toothed outer circumference and are counterrotated, as indicated by Arrows K and L. Briefly, forward movement of the carriage 32 produces a first cut, or shear, into the tire. This first cut is perpendicular to the axis of the tire. However, when the pinch point of the shears 12 and 14 is adjacent the bead wires 118, as shown in FIG. 9, rails 72 no longer permit linear movement of the tire. Yet, because of the saw-toothed circumference 22 and the shearing force of the shears, the tire continues to be drawn toward the pinch point 120 of the shears. As a result, the tire rotates about the axis of the tire. The inner edge 122 of the tire that is captured between the bead guide roll 38 and the pinch point 120 is stripped away from the outer casing of the tire. The outer casing is deposited on the side of the shears opposite the carriage, and the bead wires 118 remain wrapped about the rolls 34, 36 and 38. The carriage 32 includes an idler disc 124 which facilitates rotation of the tire when linear movement of the carriage is ceased.

B. The Coiling Process

Figure 10A:
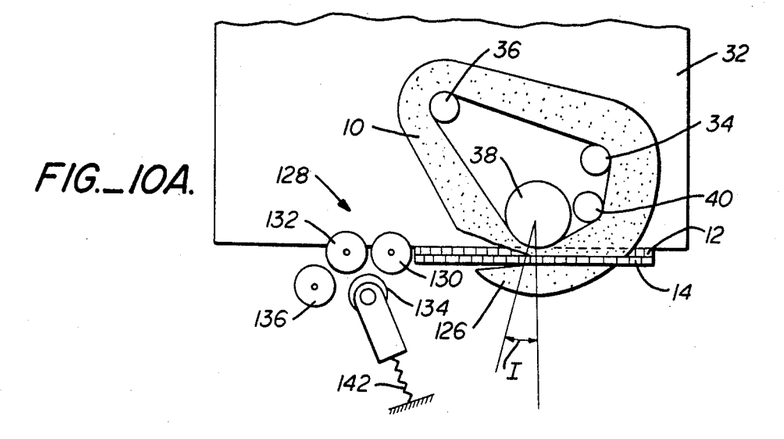
FIGS. 10A-10C are top diagrammatic views of the debeading and apparatus of the present invention illustrating the apparatus in operation.
Figure 10B:
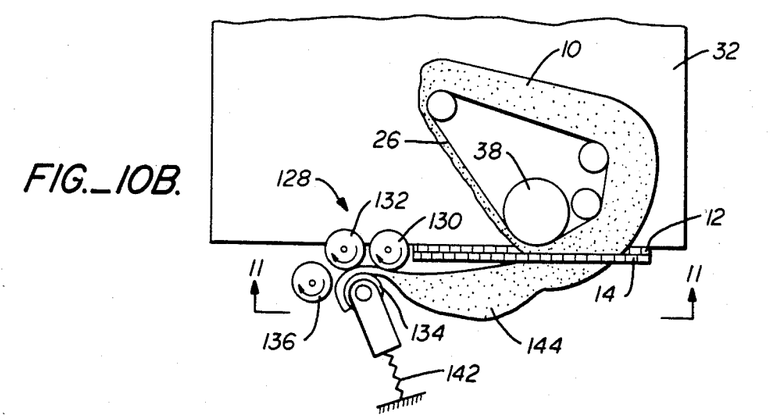
Figure 10C:
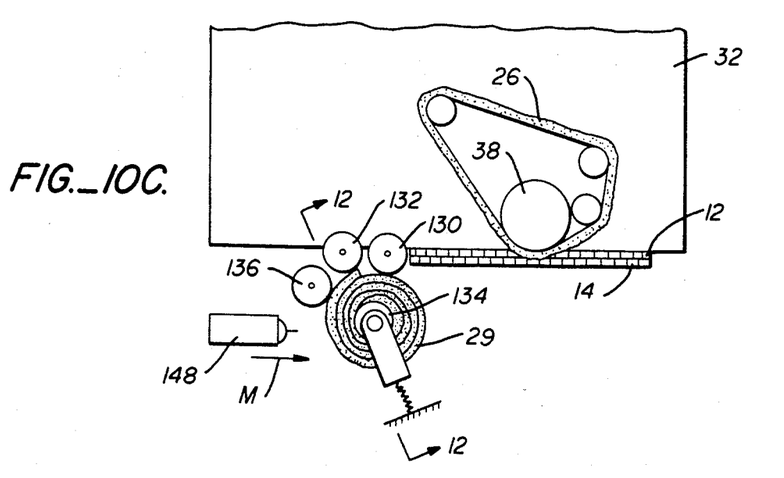

FIGS. 10A-10C illustrate the debeading process and the coiling process. Linear movement of the carriage 32 toward the shears 12 and 14 results in a linear cut into the elongated tire 10. The leading edge of the tire as it is sheared from the bead wires 26 is a tongue portion 126 which is relatively flat since the tongue portion is comprised primarily of the tire crown portion without adjoining side wall portions.

As noted above, the extent of carriage 32 travel is limited so that the pinch point defined by shears 12 and 14 will not travel beyond the bead guide roller 38 radius that is perpendicular to the direction of carriage travel. The resulting angle is designated as Angle I and is preferably between 10° and 15°. In this position, the pull provided by the shears will rotate the tire 10, thereby shearing the tire about the circumference of the bead wires.

Figure 11:
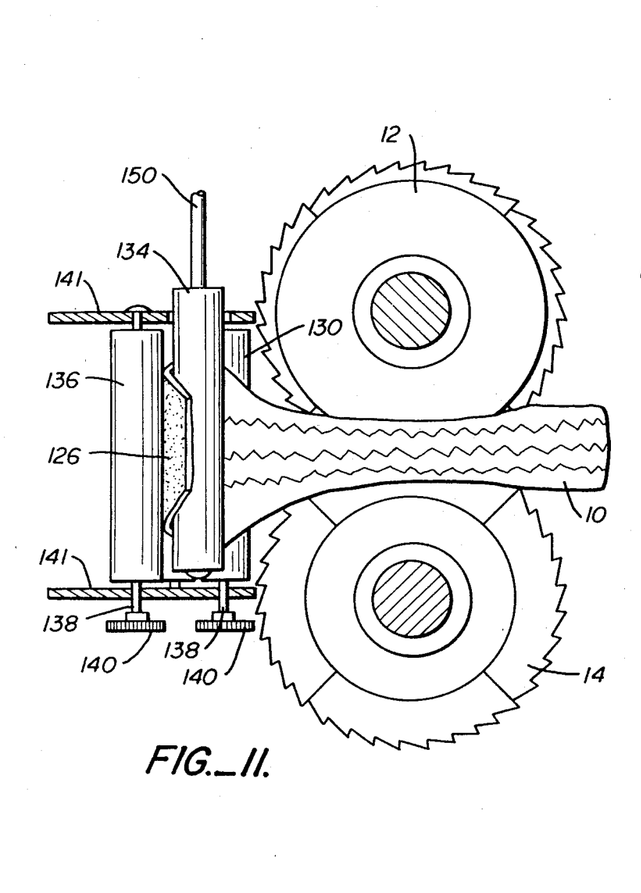
FIG. 11 is a side view of the coiling apparatus of FIG. 10B taken along lines 11—11.

The tongue portion 126 of the debeaded elongation of tire is captured by a bending assembly 128 as the tire exits from the shearing assembly. As shown in FIGS. 10B and 11, the tongue portion 126 is pressed between first and second conveyor rollers 130 and 132 and a mandrel 134. The tongue portion 126 is threaded to a curl roller 136. The conveyor rollers 130 and 132 along with the curl roller 136 are arranged in a concave configuration, relative to the mandrel 134. Thus, the tongue portion 126 is caused to follow the curvature of the mandrel 134. The frictional contact between the tire casing and the surface of the mandrel 134 induces the tongue portion to continue to follow rotation of the mandrel beyond the curl roller 136. This tendency to follow the curvature of the mandrel is aided by the elasticity of the tire as the crown portion and the tire side walls attempt to reverse the original arcs of the tire after being compressed between the rollers 130, 132 and 136 and the mandrel 134.

The conveyor rollers 130 and 132 and the curl roller 136 are each fixed to a shaft 138 having an end sprocket 140 which is rotationally driven relative to housing 141 by a gear train of a motor, not shown. The speed of the motor is matched to that of the rotational speed of the shears 12 and 14 so that the tire casing is pulled onto the conveyor rollers 130 and 132 as the shearing action permits. Typically, the shears are rotated at 17 RPM, but this is not critical.

Figure 12:
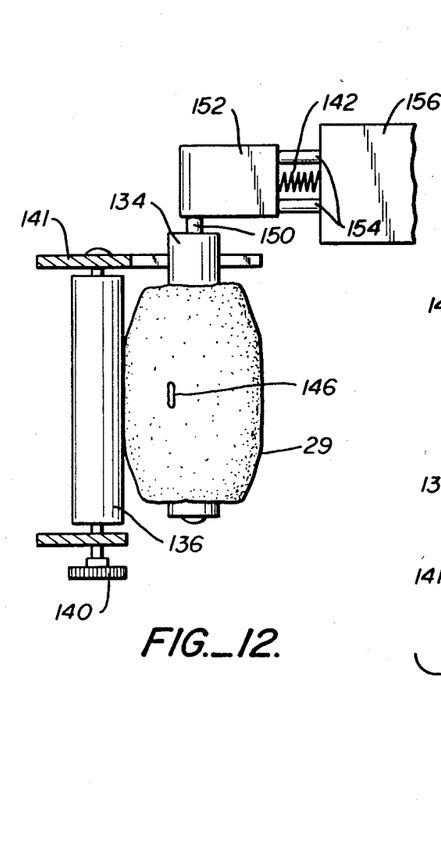
FIG. 12 is view of the coiling apparatus of FIG. 10C taken along lines 12—12.

The mandrel 134 is urged toward the second conveyor roller 132 by a spring 142. The spring 142 exerts a compression force upon the tongue portion 126. Then as the remainder of the tire casing 144 follows the tongue portion 126, the spring biased mandrel 142 sequentially compresses the lenghth of the tire portion to bring the tire side walls along a plane common to the tire crown portion. The curl roller 136 bends the tire casing 144 to provide a coil 29 about the mandrel 134, as shown in FIGS. 10C and 12. Optionally, a staple 146 may be inserted into the coil 29 by a staple gun 148, which approaches the coil 29 linearly along Arrow M. The staple 146 is not critical, as the unbalanced tension and frictional contact between layers of the coil 29 will maintain the tire casing in the coiled configuration, however less tightly wound.

Figure 13:
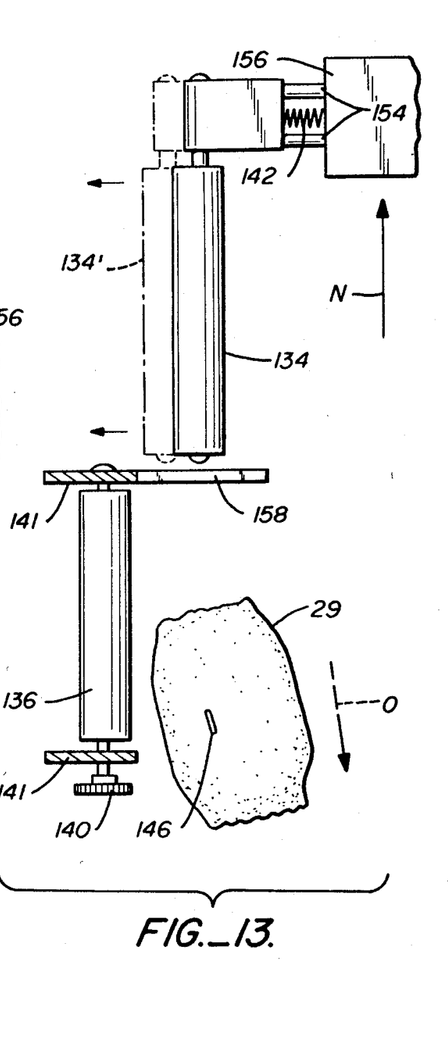
FIG. 13 is a rear view of the coiling apparatus of FIG. 12 in a discharge position.

The mandrel 134 is fixed to a shaft 150 that is rotatably mounted to a shaft head 152. The shaft head is slidably fit to a pair of rods 154 which are connected to a vertical travel member 156. After completion of the coiling, the vertical travel member 156 is moved upwardly as indicated by Arrow N in FIG. 13. The mandrel 134 follows the movement of the vertical travel member 156 but the coil is rejected from the mandrel by contact with a stripping plate 158 fixed to the housing 141. The coil 29 will be gravity discharged, as shown by Arrow 0, while the mandrel is returned by spring 142 to the position 134' of FIG. 13. The vertical travel member 156 then moves the mandrel 134 to the original alignment with respect to curl roller 136.

Optionally, the coil 29 approximates the inside diameter of the tire from which the coil was produced. The coil is easier to handle, store and transport than a beaded tire. The coiled tire may have separate utility as a boat bumper, shock absorber, or core of a wide wheel, such as an aircraft wheel.

I claim:

1. A method of compacting a tire of a type having a circular crown portion, a tire axis, laterally opposed first and second side walls and having a bead wire within each side wall, said crown portion having an exterior surface and an interior surface, comprising,
   providing a linear debeaded tire casing having a length about as great as the circumference of the tire crown portion, and
   coiling said debeaded tire casing about a coil axis.

2. The method of claim 1 further comprising fastening said coiled debeaded tire for securement in a tightly coiled condition.

3. The method of claim 1 wherein said coiling of the debeaded tire casing is accomplished by sequentially curling the length of said debeaded tire casing in a direction that is the inverse of the arc of the tire crown portion.

4. The method of claim 1 wherein said coiling of the debeaded tire is preceded by compressing said debeaded tire casing to bring the first and second side walls of the tire to a position substantially parallel to said tire crown portion.

5. The method of claim 1 wherein said coiling about said coil axis reverses an interior surface and an exterior surface of the tire crown portion relative to said tire axis.

6. An apparatus for compacting a tire of a type having a circular crown portion and laterally opposed first and second side walls extending radially inwardly from said crown portion to define a tire interior, each side wall having an inner circumferential edge and a bead wire closely adjacent said inner circumferential edge, comprising,
   rotary shearing means for shearing a tire inwardly from a tire crown portion to a location at least closely adjacent tire bead wires and for shearing said tire circularly about said tire bead wires, thereby forming an arcuate debeaded elongation of tire having a length at least as great as the circumference of the tire crown portion, and
   coiling means cooperatively arranged with respect to said rotary shearing means to receive said arcuate debeaded elongation of tire for exerting a transverse leveling force upon said debeaded elongation and for inverting the arc of said debeaded elongation in a longitudinal sequential manner to provide a curvilinear wrap of tire.

7. The apparatus of claim 6 wherein said coiling means includes a bend assembly and a mandrel, said tire crown portion having an interior surface and an exterior surface, said bending assembly arranged to sequentially receive the length of said debeaded elongation of tire, said mandrel disposed closely adjacent said bending assembly to exert said transverse leveling force upon the exterior surface of the crown portion of the debeaded elongation of tire, at least a portion of said bend assembly being concave relative to said mandrel, thereby turning said debeaded elongation back upon the mandrel for coiling about said mandrel.

8. The apparatus of claim 7 wherein said bend assembly includes at least three rollers, said rollers being disposed in a concave configuration relative to said mandrel.

9. The apparatus of claim 7 wherein said mandrel is a rotatable cylindrical roll.

10. The apparatus of claim 7 wherein said mandrel is yieldingly biased in the direction of said bend assembly.

11. The apparatus of claim 6 wherein said rotary shearing means includes at least two overlapping and counterrotating circular shearing members, including a first shearing member supported on a first shaft and a second shearing member supported on a second shaft, said shafts spaced apart from each other by a distance less than the radius of said first shearing member to provide a pinch point between said shearing members.

12. An apparatus for compacting a tire of a type having a circular crown portion and laterally opposed first and second side walls extending radially inwardly from said crown portion to define a tire interior, each side wall having an inner circumferential edge and bead wire closely adjacent said inner circumferential edge, comprising,
   shearing means having at least two overlapping and counterrotating circular shears including a first shearing member supported on a first shaft and a second shearing member supported on a second shaft, said shafts spaced apart from each by a distance less than a radius of said first shearing member to provide a pinch point between said shearing members,
   guide means for positioning a tire relative said shearing means, said guide means positioning bead wires of said tire perpendicular to the axes of said first and second shafts, tensioning means for elongating said bead wires, compression means for exerting a compression force on at least one side of said tire at the bead wire of said side wall, bringing aid bead wires of said opposed side walls into mutual proximity, advancement means for moving said guide means, said tensioning means and said compression means, said advancement means having a first extreme position and a second extreme position, said advancement means further having a path of motion from said first extreme position to said second extreme position which carries said tire into said shearing means, in a direction that is closely tangential to said bead wires, thereby providing a first, linear shear and initiating a second shear which extends circularly about the circumference of said bead wires to yield a debeaded elongation of tire, and coiling means adjacent said shearing means for compressing said debeaded elongation of tire to extend a first and second side wall of said debeaded elongation along a plane common to a tire crown portion, said tire crown portion having an interior surface and an exterior surface, said coiling means having a mandrel and a spring means and having a bend assembly, said spring means engaged with said mandrel to yieldingly bias said mandrel against said exterior surface of the tire crown portion, said bend assembly contacting said tire crown portion opposite the mandrel, at least a portion of said bend assembly being concave relative to said mandrel, thereby causing the debeaded elongation to coil about said mandrel.

13. The apparatus of claim 12 wherein said mandrel is a rotatably mounted cylindrical roll.

14. The apparatus of claim 12 wherein said guide means includes a plurality of rolls disposed to contact the inside diameter of said tire and to define the arc of a circle having a diameter of between 11 inches and 15 inches, said tensioning means including a movable tensioning roll nonuniformly spaced from said rolls of the guide means.

15. The apparatus of claim 14 wherein said advancement means is a carriage, said tensioning roll movably attached to said carriage for applying a stretching force to the bead wires of the tire.

16. The apparatus of claim 12 wherein said bend assembly includes at least three rollers, said rollers being disposed in a concave configuration relative to said mandrel.

* * * * *

UNITED STATES PATENT AND TRADEMARK OFFICE
CERTIFICATE OF CORRECTION

PATENT NO. : 4,802,635

DATED : February 7, 1989

INVENTOR(S) : Randel L. Barclay

It is certified that error appears in the above-identified patent and that said Letters Patent is hereby corrected as shown below:

Column 3, line 48, "and apparatus " should read -- and coiling apparatus --.

Column 3, line 52, "Fig.12 is view" should read -- Fig. 12 is a rear view --.

Column 7, line 40, "Wires" should read -- wires --.

Claim 12, column 11, line 4, "aid bead" should read -- said bead --.

Signed and Sealed this

Sixth Day of February, 1990

*Attest:*

JEFFREY M. SAMUELS

*Attesting Officer*     *Acting Commissioner of Patents and Trademarks*